United States Patent Office 3,282,922
Patented Nov. 1, 1966

3,282,922
CYANOETHYLSUCROSE ACYLATES
George P. Touey and John E. Kiefer, Kingsport, Tenn., assignors to Eastman Kodak Company, Rochester, N.Y., a corporation of New Jersey
No Drawing. Filed Oct. 28, 1963, Ser. No. 319,531
5 Claims. (Cl. 260—234)

This invention relates to new derivatives of sucrose. In particular, it relates to sucrose derivatives which contain both cyanoethyl groups and acyl groups.

Touey and Davis in their U.S. Patent No. 3,068,220 disclose substantially completely cyanoethylated sucrose having a high dielectric constant, high volume resistivity, and low dissipation factor. Cyanoethylsucrose has been found to be a useful component of many electrical and electronic devices. For example, it can be used in the dielectric matrix of electroluminescent cells where the dielectric constant of the cyanoethylsucrose contributes to the brightness of the cell.

The good electrical properties of cyanoethylsucrose also suggests its use as a dielectric fluid in transformers and electrical capacitors. However, the very high viscosity of cyanoethylsucrose (150,000 cps. at 40° C.) makes it difficult to impregnate transformers, electrical capacitors, and other electrical devices.

The solubility of cyanoethylsucrose in water (1% at 30° C. and 6.3% at 90° C.) limits its use as a plasticizer. Also, cyanoethylsucrose is very susceptible to moisture absorption. For example, cyanoethylsucrose when exposed to a 65% relative humidity (at 25° C.) will absorb 1.6% water. The presence of water is very undesirable in many electrical applications.

The compatibility of cyanoethylsucrose with solvents, plasticizers, and polymers often leaves something to be desired. Cyanoethylsucrose is not miscible with common plasticizers such as certain phthalate esters, nor with common dielectric fluids such as certain chlorinated aromatic compounds. Although cyanoethylsucrose is compatible with cellulose acetate, its compatibility with other polymers at high concentrations is often limited. For example, films of low viscosity cellulose acetate butyrate, such as that known sometimes as "half-second butyrate," containing 80% cyanoethylsucrose are hazy and tacky.

We have now found that a mixed ester-ether of sucrose which contains both cyanoethyl groups and acyl groups attached to the sucrose molecule overcomes various of the disadvantages of cyanoethylsucrose. It has a much lower viscosity; it is less soluble in water; it is less susceptible to moisture pick up in the atmosphere; and it is compatible with a wider range of solvents, plasticizers, and polymers than cyanoethylsucrose.

One object of our invention is to disclose a new sucrose derivative which contains both cyanoethyl and acyl groups attached to the sucrose molecule. Another object of our invention is to provide a new dielectric fluid. A further object of our invention is to provide a sucrose derivative which contains cyanoethyl groups and which (1) has a lower viscosity, (2) is less soluble in water, and (3) is compatible with a wider range of solvents, plasticizers and polymers than the cyanoethylsucrose per se. A still further object of our invention is to provide a method for preparing the above derivatives. Other objects of our invention will appear herein.

These objects are accomplished by first preparing a cyanoethylsucrose containing from 1 to 7 cyanoethyl groups per sucrose molecule. The free hydroxyl groups on the partially cyanoethylated sucrose are then acylated. The product has an empirical formula of:

(sucrose-o)(CH$_2$CH$_2$CN)$_x$(COC$_n$H$_{2n+1}$)$_y$ where sucrose-o represents sucrose minus 8 hydrogens $x=1$ to 7
$y=1$ to 7
$x+y=6, 7,$ or 8
$n=1$ to 9

The partially cyanoethylated sucrose can be prepared by the method disclosed by Touey and Davis U.S. Patent No. 3,068,220 for preparing a cyanoethylsucrose. By a modification of this procedure, sucrose derivatives can be prepared containing from 1 to 7 cyanoethyl groups. For example, sucrose is dissolved in an aqueous alkaline solution and 1 to 9 moles of acrylonitrile is added to the solution. The slurry is mixed at 0° to 80° C. for 15 minutes to 16 hours. The alkaline catalyst is then neutralized with an acid such as hydrochloric acid, sulfuric acid, phosphoric acid, or an organic acid.

The acylation of the partially cyanoethylated sucrose is carried out by straightforward esterification procedures. For example, partially cyanoethylated sucrose can be reacted with a fatty acid anhydride with or without a catalyst.

The cyanoethylsucrose acylates prepared by these methods have the following useful properties:

(1) High dielectric constant $>10$ at 25° C. and 100 cps.
(2) Low dissipation factor $<10\%$ at 25° C. and 100 cps.
(3) High volume resistivity $>1\times10^{10}$ ohm cm. at 25° C.
(4) Low moisture pick up.
(5) Low viscosity at elevated temperatures.

The following examples illustrate our invention:

EXAMPLE 1

Sucrose (342 g. or 1 mole) was dissolved in a solution consisting of 90 g. of water and 37.5 g. of potassium hydroxide at 40° C. 265 g. (5 moles) of acrylonitrile was added to the solution while mixing. The reaction was exothermic and an ice bath was used to maintain the temperature of the reaction mixture at 40 to 45° C. After 1 hour of mixing at 40 to 45° C., the reaction mixture was neutralized with n-butyric acid. The neutralized mixture containing the partially cyanoethylated sucrose and potassium butyrate was then dried at 50° C. n-Butyric anhydride (632 g. or 4 moles) was added to the gummy mass, and the mixture was heated at 90° C. for 2 hours. The n-butyric acid and excess n-butyric anhydride were then distilled from the reaction mixture under 1 to 2 mm. pressure. The gummy residue in the reaction flask was dissolved in 1000 ml. of methylene chloride. The methylene chloride solution was washed 1 time with 1000 ml. of water, then 1 time with 1000 ml. of 2% sodium hydroxide, and finally 6 times with 1000 ml. portions of distilled water. The methylene chloride was then removed by distillation. The cyanoethylsucrose butyrate thus obtained was a water white liquid having an average degree of substitution of about 4.6 cyanoethyl groups and 3.4 butyryl groups per sucrose molecule. The electrical, chemical, and physical properties were found to be:

*Electrical properties (25° C.)*

Dielectric constant=24 at 100 cps.
Dissipation factor=1.3% at 100 cps.
Resistivity=$1\times10^{11}$

*Chemical properties*

7.81% nitrogen
28.5% butyryl (calculated as

)

*Physical properties*

0.31% soluble in water at 25° C.

0.65% soluble in water at 70° C.
Viscosity=19,000 cp. at 40° C.
Water content <0.1% at 50% relative humidity
Soluble in acetone, acetic acid, chloroform, methylethylketone, ethanol.

EXAMPLE 2

Example 1 was repeated except that only 3.5 moles of acrylonitrile were used in the etherification reaction, and 6 moles of n-butyric anhydride were used in the esterification reaction. The cyanoethylsucrose butyrate thus obtained had an average degree of substitution of about 3 cyanoethyl groups and 5 butyl groups per sucrose molecule. The electrical, chemical, and physical properties were found to be as follows:

*Electrical properties (100 cps. and 25° C.)*

Dielectric constant=18 at 25° C. and 100 cps.
Dissipation factor=0.8% at 25° C. and 100 cps.
Resistivity=$6 \times 10^{11}$

*Chemical properties*

4.85% nitrogen
41.1% butyryl (calculated as

—$C C_3H_7$)

*Physical properties*

0.12% soluble in water at 25° C.
0.32% soluble in water at 90° C.
Viscosity=6,000 cp. at 40° C.

EXAMPLE 3

Example 1 was repeated except that isobutyric acid was substituted for the n-butyric acid and isobutyric anhydride was substituted for the n-butyric anhydride. The cyanoethylsucrose isobutyrate which resulted was a water white liquid having an average degree of substitution of about 4.6 cyanoethyl and 3.3 isobutryl groups per sucrose molecule. It had a dielectric constant of 24 and a dissipation factor of 1% at 100 cps. and 25° C.

EXAMPLE 4

Example 1 was repeated except that 2-ethylhexanoic acid was substituted for the n-butyric acid and 2-ethylhexanoic anhydride (4 moles) was substituted for the n-butyric anhydride. The cyanoethylsucrose 2-ethylhexanoate obtained had an average degree of substitution of 4.6 cyanoethyl groups and 3.2 2-ethylhexanoate groups. It had a dielectric constant of 20 and a dissipation factor of 1% at 100 cps. and 25° C. It was a water white free-flowing liquid at room temperature. It was soluble in ketones, such as acetone and methylethylketone; alcohols, such as methanol and ethanol; and esters, such as ethyl acetate and ethyl butyrate. It was compatible with plasticizers such as dimethyl phthalate, dioctyl phthalate, and sucrose acetate isobutyrate. Its solubility in water was less than 0.2% at 70° C.

EXAMPLE 5

Sucrose (342 g.) was dissolved in 90 g. of water. 20 g. of a basic type ion exchange agent (Amberlite IR 4B sold by Rohm and Haas Co.) was added, and the slurry was heated to 70° C. 106 g. (2 moles) of acrylonitrile was added and the reaction was continued at 70° C. for 2 hours. The slurry was filtered to remove the catalyst. The water was removed by distillation in vacuo, then 8 moles of n-butyric anhydride and 25 g. of sodium acetate were added to the light yellow syrup. The solution was heated for 2 hours at 100° C., then the excess n-butyric anhydride and n-butyric acid were removed by distillation under 0.5 mm. pressure. The product was dissolved in 1000 ml. of 1,2-dichloroethane and washed once with 1000 ml. of 1% sodium hydroxide and 8 times with 1000 ml. portions of distilled water. The 1,2-dichloroethane was removed by distillation. The sample was a water white free-flowing liquid and contained an average of about 1.7 cyanoethyl groups and 6.2 n-butyryl groups per sucrose molecule. It had a dielectric constant of 12 and a dissipation factor of 0.7% at 25° C. and 100 cps. It was soluble in a wide range of organic solvents including ketones, alcohols and esters.

EXAMPLE 6

A solution was prepared consisting of 80 parts of cyanoethylsucrose butyrate prepared as in Example 1, 20 parts of low viscosity cellulose acetate butyrate (half-second butyrate) and 900 parts of methylene chloride. The dope was poured onto a glass plate and the solvent was evaporated. The clear, tough film which was obtained had a dielectric constant of 17 at 100 cps. and 25° C.

EXAMPLE 7

A solution consisting of 90 parts of cyanoethylsucrose butyrate and 10 parts of polyvinyl acetate (Gelva 25) was cast into a film as in Example 5. The film was clear, non-tacky, and had a dielectric constant of 20.

The cyanoethylsucrose acylates which comprise this invention contain from 1 to 7 cyanoethyl groups and from 1 to 7 acyl groups per sucrose molecule. The acyl groups are derived from the fatty acids containing from 2 to 10 carbon atoms.

The cyanoethylsucrose acylates are prepared by a 2-step process—cyanoethylation followed by esterification. The cyanoethylation can be carried out with an alkaline catalyst. Catalysts which have been found to be useful are sodium hydroxide, potassium hydroxide, lithium hydroxide, and basic type ion exchange agents. Some other cyanoethylation catalyst such as an amine, alcoholate or ammonium hydroxide could also be used as the alkaline catalyst.

The temperature at which the cyanoethylation is carried out has an effect on the electrical properties. Temperatures within the range of 20° C. and 50° C. were preferred in most cases, although the reaction will take place from about 0° C. to 80° C. However, at temperatures less than about 20° C. the reaction is slow, and above about 50° C., products with inferior electrical properties may result.

If an insoluble cyanoethylation catalyst such as an ion exchange agent is used, it can be filtered from the reaction mixture and no neutralization step is needed. However, if a soluble catalyst, such as sodium or potassium hydroxide is used, the catalyst is neutralized with an acid at the completion of the cyanoethylation. Any acid capable of bringing the pH of the solution to about 7 can be used, but it is convenient to use the fatty acid which will be used in esterifying the remaining hydroxyl groups. For example, if it is desired to make a cyanoethylsucrose isobutyrate, isobutyric acid can be used to neutralize the catalyst. The isobutyrate salt which is formed can then serve as the esterification catalyst.

The esterification temperature is not critical. Usually temperatures within the range of 50° C. to 120° C. are used. Temperatures above 120° C. sometimes produce excessive color, while temperatures below about 50° C. may result in excessively long reaction times.

The esterification reaction can be carried out with fatty acid anhydrides containing from 4 to 20 carbon atoms. Anhydrides of acetic, propionic, butyric, valeric, hexanoic, octanoic, and capric acid can be used. However, anhydrides containing 8 to 16 carbon atoms are preferred. Butyric, valeric, hexanoic, and 2-ethylhexanoic anhydrides are particularly useful.

We claim:
1. A sucrose derivative having the formula:

where sucrose-o represents sucrose minus 8 hydrogens and $x=1$ to 7, inclusive $y = 1$ to 7, inclusive
$x + y = 6$ to 8, inclusive
$n = 1$ to 9, inclusive 2. Cyanoethylsucrose butyrate having 1–7 cyanoethyl groups and 7–1 butyryl groups per sucrose molecule.

3. Cyanoethylsucrose isobutyrate having 1–7 cyanoethyl groups and 7–1 isobutyryl groups per sucrose molecule.

4. Cyanoethylsucrose 2-ethylhexanoate having 1–7 cyanoethyl groups per sucrose molecule.

5. Cyanoethylsucrose having an average degree of substitution of about 4.6 cyanoethyl groups and 3.4 butyryl groups per sucrose molecule.

References Cited by the Examiner

UNITED STATES PATENTS

| | | | |
|---|---|---|---|
| 2,399,602 | 4/1946 | Rauner et al. | 106—178 |
| 2,461,502 | 2/1949 | Moe | 260—209 |
| 2,635,967 | 4/1953 | Gearhart et al. | 106—178 |
| 3,054,789 | 9/1962 | D'Amato | 260—234 |
| 3,057,743 | 10/1962 | Touey et al. | 260—234 |
| 3,068,220 | 12/1962 | Touey et al. | 260—209 |
| 3,102,114 | 8/1963 | Komori | 260—234 |

LEWIS GOTTS, *Primary Examiner*.

J. R. BROWN, *Assistant Examiner*.